US011152752B2

(12) United States Patent
Amini et al.

(10) Patent No.: US 11,152,752 B2
(45) Date of Patent: Oct. 19, 2021

(54) AUDIO JACK HAVING INTEGRATED GROUNDING

(71) Applicant: Apple Inc., Cupertino, CA (US)

(72) Inventors: Mahmoud R. Amini, Sunnyvale, CA (US); Rui Zhou, Sunnyvale, CA (US); Ameya V. Nilkanth, Dove Canyon, CA (US); James E. Harper, Paso Robles, CA (US); Mariel L. Lanas, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 83 days.

(21) Appl. No.: 16/428,696

(22) Filed: May 31, 2019

(65) Prior Publication Data

US 2020/0099181 A1    Mar. 26, 2020

Related U.S. Application Data

(60) Provisional application No. 62/736,391, filed on Sep. 25, 2018.

(51) Int. Cl.
| | |
|---|---|
| *H01R 13/436* | (2006.01) |
| *H01R 24/58* | (2011.01) |
| *H01R 13/405* | (2006.01) |
| *H01R 12/59* | (2011.01) |
| *H01R 107/00* | (2006.01) |

(52) U.S. Cl.
CPC ........... *H01R 24/58* (2013.01); *H01R 12/592* (2013.01); *H01R 13/405* (2013.01); *H01R 13/4367* (2013.01); *H01R 13/436* (2013.01); *H01R 2107/00* (2013.01)

(58) Field of Classification Search
None
See application file for complete search history.

(56) References Cited

U.S. PATENT DOCUMENTS

| | | | | |
|---|---|---|---|---|
| 3,214,713 | A * | 10/1965 | Strobel | .................. H01R 12/59 439/418 |
| 4,797,120 | A | 1/1989 | Ulery | |
| 5,194,010 | A * | 3/1993 | Dambach | ........... H01R 12/7029 439/79 |
| 5,605,477 | A * | 2/1997 | Wu | ...................... H05K 1/0233 439/620.24 |
| 5,622,523 | A | 4/1997 | Kan | |

(Continued)

OTHER PUBLICATIONS

First Action Interview Office Action Summary dated Apr. 23, 2020 in U.S. Appl. No. 16/428,603, 12 pages.

(Continued)

*Primary Examiner* — Felix O Figueroa
(74) *Attorney, Agent, or Firm* — Kilpatrick Townsend & Stockton, LLP

(57) ABSTRACT

Audio jacks and device enclosures that provide proper grounding, are readily reworkable, provide improved ventilation, and have an aesthetically pleasing appearance. An example can include a device enclosure including an enclosure wall and a sleeve for an audio jack. The sleeve can connect to ground through various paths. The audio jack housing can be inserted in the sleeve and kept in place using a fastener. This arrangement can allow the audio jack to be readily reworkable. The sleeve can be narrow at the enclosure wall for improved ventilation and an aesthetically pleasing appearance.

20 Claims, 18 Drawing Sheets

(56) References Cited

U.S. PATENT DOCUMENTS

| | | | |
|---|---|---|---|
| 5,735,699 A | 4/1998 | Tan | |
| 5,755,592 A | 5/1998 | Hillbish | |
| 6,066,001 A | 5/2000 | Liptak | |
| 6,227,904 B1 | 5/2001 | Wang | |
| 6,231,384 B1 | 5/2001 | Kuo | |
| 6,238,241 B1 | 5/2001 | Zhu | |
| 6,238,244 B1 | 5/2001 | Yang | |
| 6,359,214 B1 | 3/2002 | Worley | |
| 6,483,023 B1 | 11/2002 | Jacques | |
| 6,508,653 B2 | 1/2003 | Malone | |
| 6,600,865 B2* | 7/2003 | Hwang | H01R 13/659 385/134 |
| 6,824,403 B2 | 11/2004 | Hall | |
| 7,322,854 B2 | 1/2008 | Long | |
| 7,473,131 B2 | 1/2009 | Dunwoody | |
| 7,481,676 B2 | 1/2009 | Walter | |
| 7,510,430 B2 | 3/2009 | Zhang | |
| 7,934,848 B1 | 5/2011 | Pever | |
| 8,096,834 B2 | 1/2012 | Lai | |
| 8,133,071 B2* | 3/2012 | Huang | H01R 12/778 439/499 |
| 8,298,016 B2 | 10/2012 | Lai | |
| 8,500,486 B2 | 8/2013 | Buck | |
| 8,672,710 B2 | 3/2014 | Feldstein | |
| 8,721,364 B2 | 5/2014 | Lai et al. | |
| 8,968,031 B2 | 3/2015 | Simmel | |
| 9,176,357 B2 | 11/2015 | Lam et al. | |
| 9,209,540 B2* | 12/2015 | Raff | H01R 12/716 |
| 9,445,528 B2 | 9/2016 | Cohen | |
| 9,450,345 B2* | 9/2016 | Weigand | H05K 1/118 |
| 9,799,995 B1 | 10/2017 | Zhou | |
| 9,954,318 B2 | 4/2018 | Lee | |
| 10,587,081 B2* | 3/2020 | Valenti | H01R 13/6477 |
| 2004/0180574 A1 | 9/2004 | Liu | |
| 2007/0128936 A1 | 6/2007 | Long | |
| 2009/0305575 A1 | 12/2009 | Lin | |
| 2015/0056854 A1 | 2/2015 | Scholeno | |
| 2016/0056585 A1 | 2/2016 | Dunwoody et al. | |

OTHER PUBLICATIONS

First Action Interview Pilot Program Pre-Interview Communication dated Jan. 14, 2020 in U.S. Appl. No. 16/428,603, 7 pages.

Notice of Allowance dated Jan. 17, 2020 in U.S. Appl. No. 16/428,630, 11 pages.

Conductive Elastomer Engineering Handbook, [online], Parker Hannifin Corporation, 2018, [retrieved on Jan. 8, 2020]. Retrieved from the Internet: <URL: https://www.sealingdevices.com/documents//Conductive_Elastomer_Eng_Handbook_2018_4-12-2_TABS_ONLINE.pdf>; 152 pages.

U.S. Appl. No. 16/428,639 (Unpublished), filed May 31, 2019, titled "IO Integration With Floating Connectors in a Mesh," Andre, et al., 31 pages.

U.S. Appl. No. 16/428,603 (Unpublished), filed May 31, 2019, titled "Floating Connector System With Integrated EMI Gasket," Zhou, et al., 49 pages.

* cited by examiner

AUDIO JACK HAVING INTEGRATED GROUNDING

CROSS-REFERENCES TO RELATED APPLICATIONS

This application claims the benefit of U.S. provisional patent application No. 62/736,391, filed Sep. 25, 2018, which is incorporated by reference.

BACKGROUND

Portable electronic devices, desktop computers, and other devices can provide audio signals to drive speakers, headphones, and other sound re-creation devices. To facilitate this, these devices can include audio jacks, into which an audio plug connected to a speaker or headphone can be inserted.

An audio jack can be located at a surface of a device enclosure of an electronic device. The device enclosure can be conductive and grounded. The audio jack can include ground contacts that can also be grounded. But improper or insufficient grounding of the device enclosure or audio jack can generate noise that can degrade the audio performance. For improved audio performance, it can be desirable that the device enclosure and audio jack be properly grounded.

Audio jacks can include several contacts and other components that can be subject to yield loss. This can occasionally require that an audio jack be reworked after assembly. Being able to rework an audio jack can allow an otherwise nonfunctional electronic device or component to be made functional. Accordingly, it can be desirable to be able to readily rework these audio jacks.

These electronic devices can include circuits, such as central processing units, graphics processing circuits, and other circuits. These circuits can consume large amounts of power and dissipate a great deal of heat. This heat can compromise device performance. For example, this heat can shorten circuit lifetime and can slow the circuits of the electronic devices. It can therefore be desirable that the device enclosure allow this heat to escape. That is, it can be desirable to provide device enclosures having improved ventilation.

The appearance of these device enclosures and audio jacks can be perceived to reflect upon the quality and value of the electronic devices. An aesthetically pleasing appearance can provide a user with a sense of quality and value. Accordingly, it can be desirable that these device enclosures and audio jacks have an aesthetically pleasing appearance.

Thus, what is needed are audio jacks and device enclosures that provide proper grounding, are readily reworkable, provide improved ventilation, and have an aesthetically pleasing appearance.

SUMMARY

Accordingly, embodiments of the present invention can provide audio jacks and device enclosures that provide proper grounding, are readily reworkable, provide improved ventilation, and have an aesthetically pleasing appearance.

An illustrative embodiment of the present invention can provide audio jacks and device enclosures that are properly grounded. A device enclosure for an electronic device can provide an enclosure wall having an opening through which an audio plug can be inserted into a corresponding audio jack. The enclosure wall can further include a sleeve for the audio jack that can extend from the enclosure wall into the electronic device. The audio jack can be located in the sleeve. The sleeve can electrically connect to an endcap of the audio jack, which can further connect though a fastener to a stiffener, which can be connected to a ground on a flexible circuit board or other appropriate substrate. This first ground path can ground the device enclosure through the audio jack. Also, a ground contact in the audio jack can include a contacting portion that can physically and electrically connect to the sleeve. This contact can be connected to the ground on the flexible circuit board or other appropriate substrate. This second ground path can also ground the device enclosure through the audio jack. A third ground path through a ground contact in the audio jack that mates with a corresponding ground contact on an audio plug can also be included. The third ground path can be kept isolated, for example using a filter, from the first and second ground paths for noise reasons.

An illustrative embodiment of the present invention can provide audio jacks that can be readily reworked. For example, a housing assembly can be inserted through a rear opening and into a corresponding sleeve. An endcap and fastener can be inserted into the rear opening of the sleeve, and the fastener can be turned in a first direction (for example, clockwise) to lock the housing assembly in place. In these and other embodiments of the present invention, the fastener and endcap can be a single piece. The audio jack housing can be keyed to prevent it from rotating when the fastener is turned. Rework can be readily performed by turning the fastener in a second direction opposite the first direction (for example, counter-clockwise), removing the endcap and fastener, and removing the housing assembly.

The housing assembly can be formed in various ways. For example, the housing can be formed around the contacts, or the contacts can be inserted in the housing. An organizer can be attached to the back of the housing to keep tails of the contacts aligned. A stiffener can be attached to, or formed as part of, a flexible circuit board. The flexible circuit board and stiffener can be placed against a back of the organizer such that the stiffener can be against the organizer and between the organizer and the flexible circuit board. The flexible circuit board can be soldered to the tails of the contacts. The flexible circuit board can have an opening such that the fastener can physically contact the stiffener and not crush or damage the flexible circuit board.

In these and other embodiments of the present invention, the enclosure wall and sleeve can be integrally formed. In these and other embodiments of the present invention, the enclosure wall and sleeve can be formed separately. The sleeve can then be attached to the enclosure wall, for example by soldering, laser or spot welding, or other technique.

An illustrative embodiment of the present invention can provide device enclosures having improved ventilation. For example, an enclosure wall can be formed as a mesh or other non-solid surface. In these and other embodiments of the present invention, the enclosure wall can be formed to have the appearance of being a mesh. The enclosure wall can include a pattern of perforations or holes to allow the passage of air to improve ventilation. For example, a pattern of holes can be formed in the enclosure wall to give the enclosure wall a mesh-like appearance.

In these and other embodiments of the present invention, the sleeve can be arranged to help to improve air flow though the mesh of the enclosure wall. For example, the enclosure wall can have an opening for an audio jack. A sleeve can have a front opening or front aperture aligned with the enclosure wall opening. In these and other embodiments of the present invention, the front aperture can have a minimum width to accept a corresponding audio plug.

The sleeve can have a thickness that is limited to at least approximately the thickness of the mesh of the enclosure wall, where the thickness of the mesh is the lateral thickness of the mesh of the enclosure wall between adjacent holes or perforations. This limited profile for an audio jack can improve ventilation through the enclosure wall.

The sleeve can act as a shield for the audio jack. This can allow contacts or other portions of the audio jack to be pulled away from the enclosure wall thereby allowing a narrower sleeve front aperture. This narrow front end to the sleeve can help to further improve ventilation and prevent air flow through the enclosure wall from being blocked by the sleeve and audio jack.

A sleeve can taper to a rear aperture away from the enclosure wall and inside the electronic device. The rear aperture can be wider or larger than the front aperture and it can be wide enough to accept a front end of an audio jack and a corresponding audio plug. The sleeve can widen in steps from the front aperture to the rear aperture. The sleeve can instead widen in a line or curve from the front aperture to the rear aperture. In these and other embodiments of the present invention, the sleeve can have other widening contours. In these and other embodiments of the present invention, the sleeve can maintain its width, it can have narrowing portions, or it can have other contours.

An illustrative embodiment of the present invention can provide audio jacks and device enclosures having an aesthetically pleasing appearance. For example, even though an enclosure wall can have a number of holes or perforations for a mesh appearance, the audio jacks might only be visible to a limited extent. For example, a tapered sleeve can provide a minimal front aperture for an improved appearance. The tapered sleeve can limit the visibility of the audio jacks and their structures as viewed from outside the electronic device. Some or all of the enclosure wall and sleeve can be darkened to absorb light and reduce reflections. Some of all of these structures can be darkened using a conductive black PVD (physical vapor deposition) process, cosmetic tape, paint, pad printing, plating, laser darkening, or other process or material. In these and other embodiments of the present invention, a flexible circuit board supporting the audio jack can be colored to match either or both the enclosure wall and sleeve. For example, these structures can each be colored black, though they can have other colors as well. This can give an audio jack at an opening in the enclosure wall the appearance that it is floating in the mesh of the enclosure wall.

These enclosure walls and sleeves can be formed in various ways in these and other embodiments of the present invention. For example, they can be formed by machining, such as by using computer numerical controlled machines, stamping, deep drawing, forging, metal-injection molding, micro-machining, 3-D printing, or other manufacturing process. These enclosure walls and sleeves can be formed of various materials. For example, they can be formed of aluminum, steel, stainless steel, copper, bronze, or other material. In these and other embodiments of the present invention, a material having good electrical and thermal conductivity can be chosen.

In various embodiments of the present invention, contacts, stiffeners, endcaps, fasteners, and other portions of audio jacks and device enclosures can be formed by stamping, metal-injection molding, machining, micro-machining, 3-D printing, or other manufacturing process. These portions can be formed of stainless steel, steel, copper, copper titanium, phosphor bronze, or other material or combination of materials. They can be plated or coated with nickel, gold, or other material. Other portions, such as audio jack housings and other structures can be formed using injection or other molding, 3-D printing, machining, or other manufacturing process. These portions can be formed of silicon or silicone, rubber, hard rubber, plastic, nylon, liquid-crystal polymers (LCPs), ceramics, or other nonconductive material or combination of materials.

Embodiments of the present invention can provide audio jacks and device enclosures that can be located in, or can connect to, various types of devices, such as portable computing devices, tablet computers, desktop computers, laptops, all-in-one computers, wearable computing devices, smartphones, storage devices, portable media players, navigation systems, monitors, power supplies, video delivery systems, adapters, remote control devices, chargers, and other devices.

Various embodiments of the present invention can incorporate one or more of these and the other features described herein. A better understanding of the nature and advantages of the present invention can be gained by reference to the following detailed description and the accompanying drawings.

DESCRIPTION OF ILLUSTRATIVE EMBODIMENTS

Figure 1:
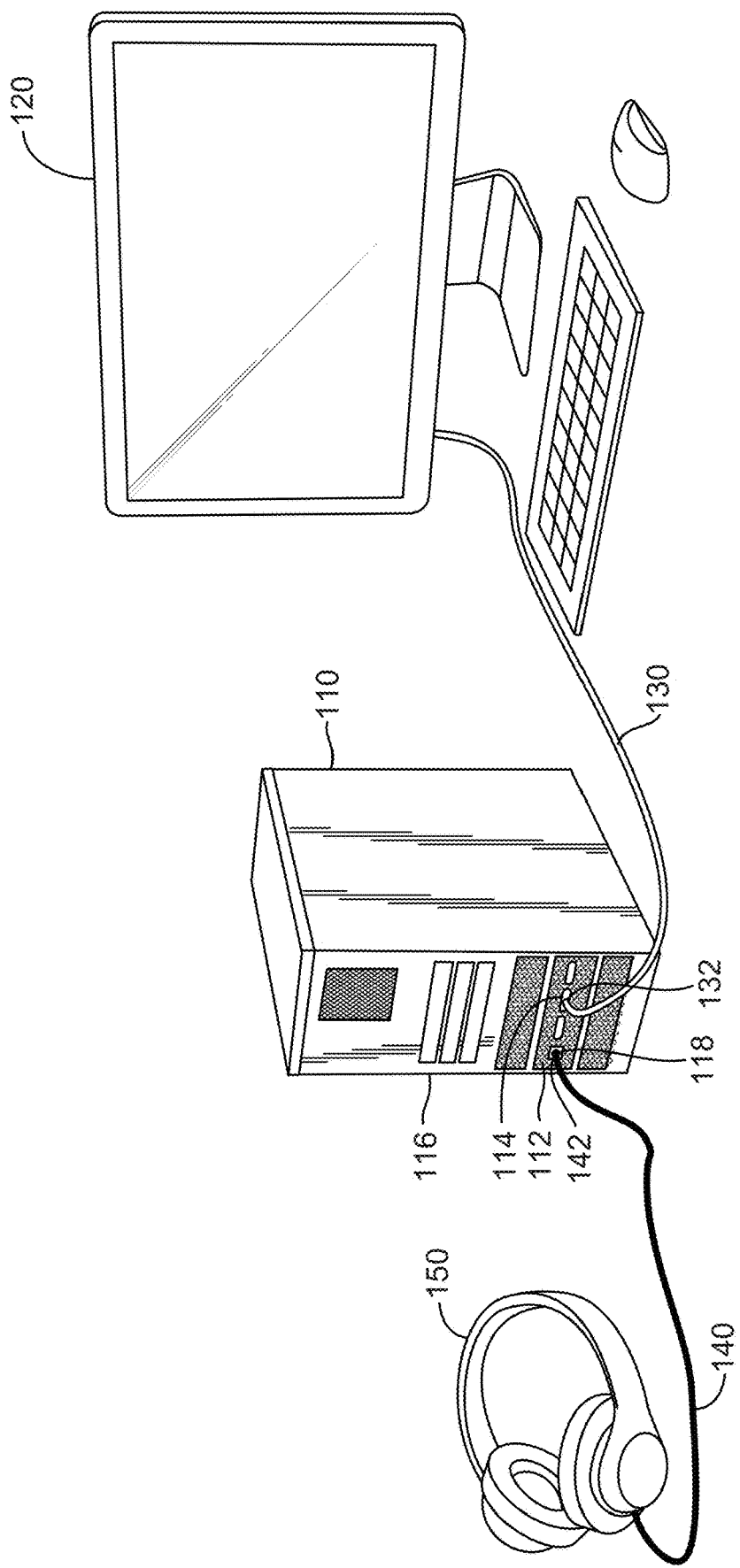
FIG. 1 illustrates an electronic system according to an embodiment of the present invention.

FIG. 1 illustrates an electronic system according to an embodiment of the present invention. This figure, as with the other included figures, is shown for illustrative purposes and does not limit either the possible embodiments of the present invention or the claims.

In this example, an electronic system can include desktop computer 110 that is in communication with monitor 120 and headphones 150. Desktop computer 110 can include a Peripheral Component Interconnect Express (PCIe) card or computer expansion card, or other electronic device having enclosure wall 112. Desktop computer 110 can be housed in a device enclosure including case 116 and computer expansion card enclosure wall 112. In these and other embodiments of the present invention, enclosure wall 112 can be a portion of a device enclosure placed in an opening in case 116 of desktop computer 110. For example, enclosure wall 112 can be located in an opening in a front, top, or a rear of case 116 of desktop computer 110, or it can be located in these or other locations on other electronic devices. Desktop computer 110 can use the computer expansion card to provide graphics information to monitor 120 over cable 130, and to provide audio information over cable 140 to headphones 150. In these and other embodiments of the present invention, this computer expansion card can provide graphics, sound, networking, and other functions for desktop computer 110. In these and other embodiments of the present invention, desktop computer 110 can employ two or more such computer expansion cards, for example, where a first computer expansion card provides graphics and other information to monitor 120, while a second computer expansion card provides audio signals over cable 140 to headphones 150.

Cable 130 can be one of a number of various types of cables. For example, it can be a Universal Serial Bus (USB) cable such as a USB Type-A cable, USB Type-C cable, HDMI, Thunderbolt, DisplayPort, Lightning, or other type of cable. Cable 130 can include compatible connector inserts 132 that plug into connector receptacle 114 on desktop computer 110 and a connector receptacle (not shown) on monitor 120. Cable 140 can be an audio cable having an audio plug 142 at one end that is inserted into opening 118 for audio jack 320 (shown in FIG. 3) in enclosure wall 112.

In these and other embodiments of the present invention, either or both desktop computer 110 and monitor 120 can instead be portable computing devices, tablet computers, desktop computers, laptops, all-in-one computers, wearable computing devices, smart phones, storage devices, portable media players, navigation systems, monitors, power supplies, video delivery systems, adapters, remote control devices, chargers, or other devices. Headphones 150 can be speakers, sound bars, or other audio equipment.

Figure 2:
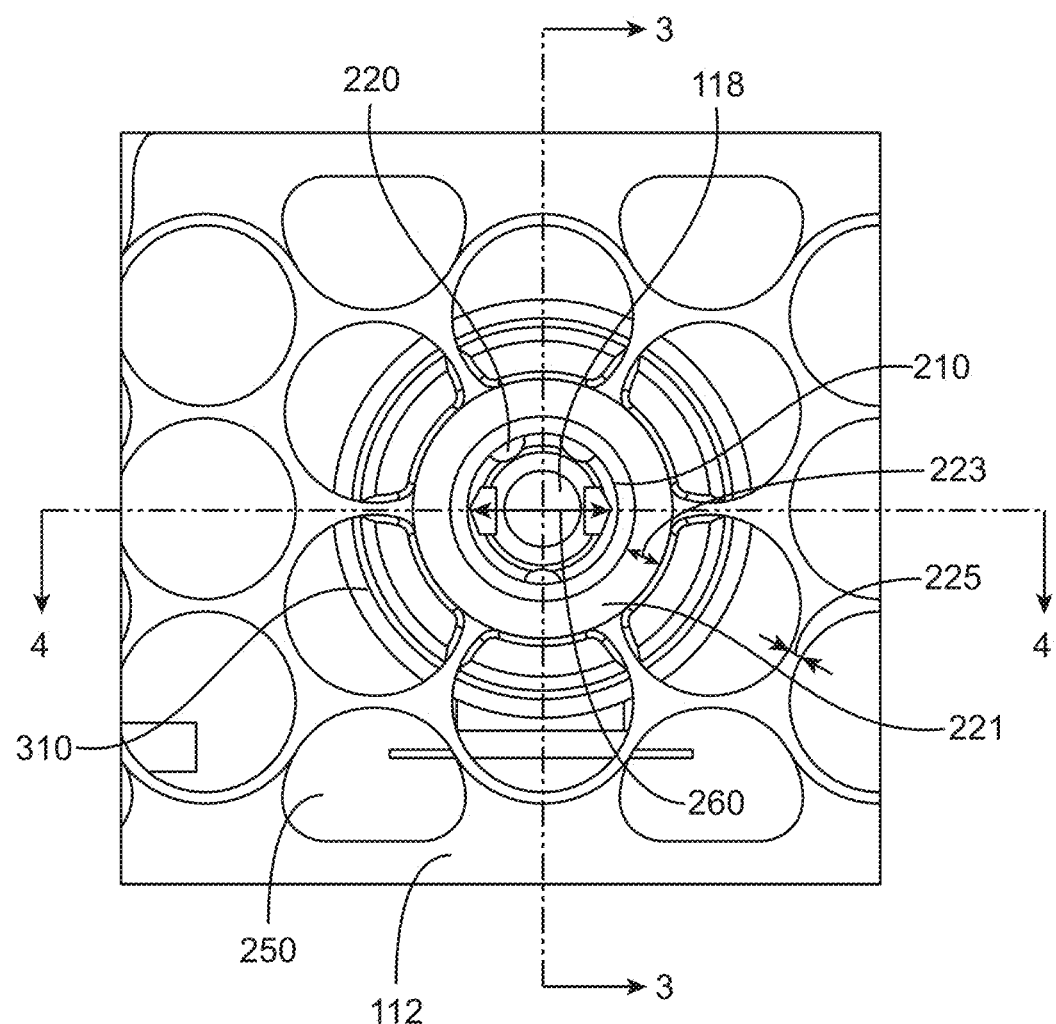
FIG. 2 illustrates a portion of a device enclosure according to an embodiment of the present invention.

FIG. 2 illustrates a portion of a device enclosure according to an embodiment of the present invention. In this example, enclosure wall 112 can be a portion of a computer expansion card and can be located in an opening in case 116 (shown in FIG. 1), or it can be a portion of a device enclosure such as case 116 of desktop computer 110. In these and other embodiments of the present invention, enclosure wall 112 can be located in an opening in a front, top, or rear or case 116 of desktop computer 110, and it can be there or elsewhere in another device enclosure for another type of electronic device.

These and other embodiments of the present invention can provide device enclosures, such as enclosure walls 112, having improved ventilation. For example, enclosure wall 112 can be formed as a mesh or other non-solid surface. In these and other embodiments of the present invention, enclosure wall 112 can be formed to have the appearance of being a mesh. Enclosure wall 112 can include a pattern of holes or perforations 250 to allow the passage of air to improve ventilation. For example, a pattern of holes or perforations 250 can be formed in enclosure wall 112 to give enclosure wall 112 a mesh-like appearance. In these and other embodiments of the present invention, enclosure wall 112 can instead be formed already having holes or perforations 250.

These holes or perforations 250 can allow improved ventilation for components inside case 116. In this example, enclosure wall 112 can further include opening 118 for an audio jack 320 (shown in FIG. 3.) Opening 118 can have a minimal size or front aperture 260 while still being able to accept a corresponding audio plug 142 (shown in FIG. 1.) Opening 118 can provide access to contacts 220, which can be supported by housing 210. Opening 118 can be surrounded by an enclosure opening ring 221 having an annular ring width 223 that is limited to at least approximately the thickness 225 of the mesh, where the thickness of the mesh is the lateral thickness 225 of the mesh of enclosure wall 112 between adjacent holes or perforations 250. The reduced size or enclosure opening ring 221 can help to preserve the mesh appearance at the surface of enclosure wall 112. This reduced size can also help to improve ventilation of desktop computer 110 and its components by reducing the size of structures that can otherwise block holes or perforations 250 in enclosure wall 112. Further details of enclosure walls 112, including their structure, methods of manufacturing, and the materials that can be used, can be found in U.S. Provisional Patent Application No. 62/736,299, titled "HOUSING CONSTRUCTION," filed Sep. 25, 2018, and co-pending U.S. patent application Ser. No. 16/412,240, titled "HOUSING CONSTRUCTION," filed May 14, 2019, which are incorporated by reference.

In these and other embodiments of the present invention, ventilation can be further improved by employing sleeve 310 as a shield for audio jack 320. This sleeve 310 can be integrally formed with enclosure wall 112. In these and other embodiments of the present invention, sleeve 310 can be formed separately from enclosure wall 112 and then attached to enclosure wall 112 by soldering, spot or laser welding, or other method. Sleeve 310 can further help to reduce the size of structures that can otherwise block holes or perforations 250 in enclosure wall 112. Sleeve 310 can also allow structures to be positioned away from enclosure wall 112 further into the electronic device such that ventilation is improved. Cross-sections of audio jack 320 are shown in the following figures.

Figure 3:
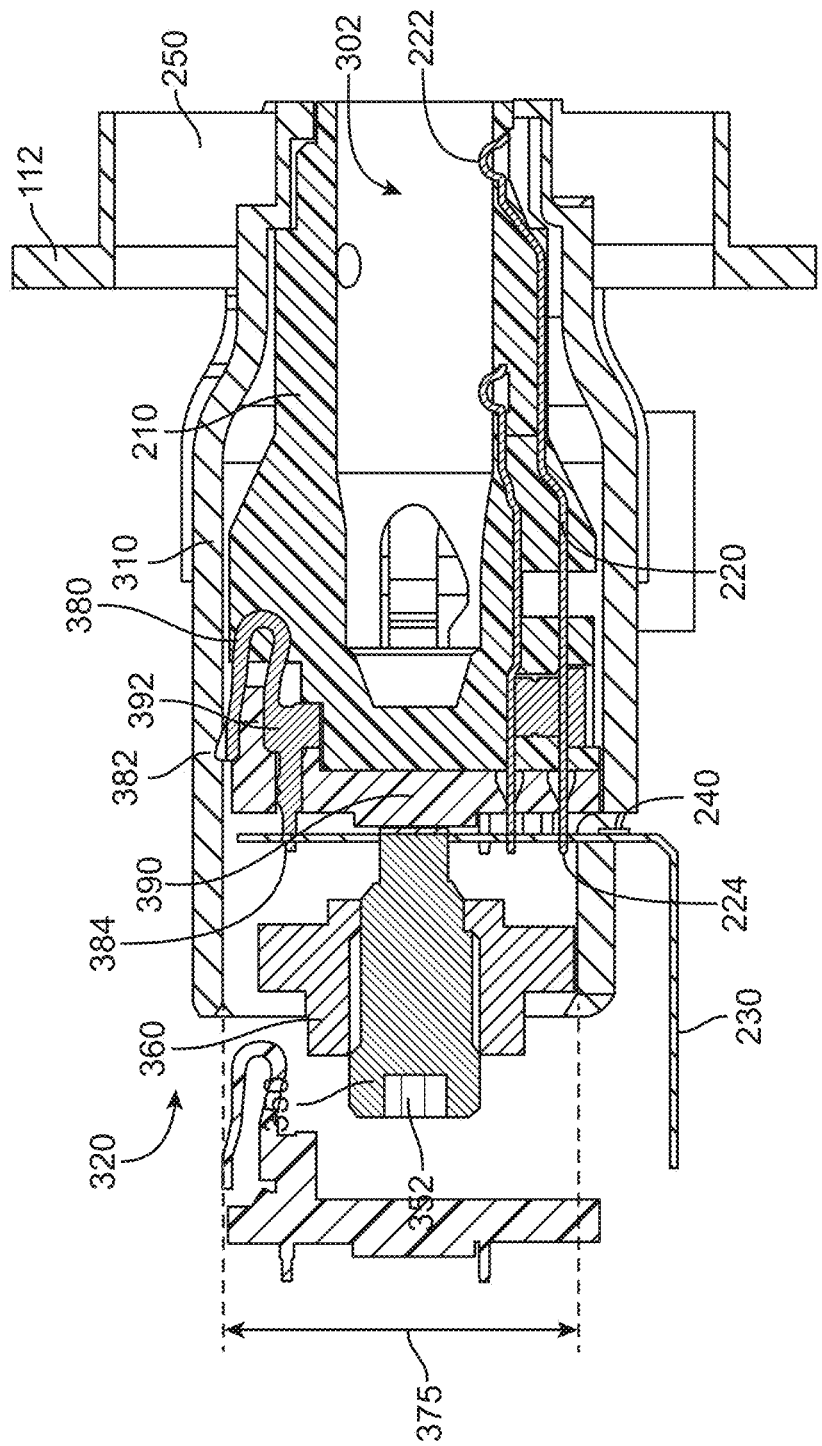
FIG. 3 illustrates a cross-section of an audio jack and device closure according to an embodiment of the present invention.

FIG. 3 illustrates a cross-section of an audio jack and device closure according to an embodiment of the present invention. This cross-section is taken along cutline "3-3" of FIG. 2. In this example, audio jack 320 can be located in sleeve 310, which can be formed as part of enclosure wall 112. Enclosure wall 112 can include holes or perforations 250 for ventilation. Sleeve 310 can extend from enclosure wall 112 into an electronic device. Sleeve 310 can widen or taper towards an interior of the device where it can have rear aperture 375. Rear aperture 375 can be wider or larger than front aperture 260 (shown in FIG. 2.) Front aperture 260 can be wide enough to accept a front end of audio jack 320 and corresponding audio plug 142 (shown in FIG. 1.) Sleeve 310 can widen in steps from front aperture 260 to rear aperture 375. Sleeve 310 can instead widen in a line or curve from front aperture 260 to rear aperture 375. In these and other embodiments of the present invention, sleeve 310 can have other widening contours. In these and other embodiments of the present invention, sleeve 310 can maintain its width, it can have narrowing portions, or it can have other contours.

Housing 210 can be located in sleeve 310. Housing 210 can include passage 302 that can accept a corresponding audio plug 142 (shown in FIG. 1.) Housing 210 can support a number of contacts 220. Contacts 220 can include contacting portions 222 that can physically and electrically connect to contacts on the corresponding audio plug 142. Contacts 220 can further include contact tails 224. Contacts 220 can be relatively long since they terminate at a rear of housing 210. Accordingly, organizer 390 can be used to align contact tails 224 of contacts 220. Contact tails 224 can be soldered or otherwise attached to flexible circuit board 230. Flexible circuit board 230 can be routed to other electronic audio circuits (not shown) in the electronic device.

Housing 210 and organizer 390 can be held in place by endcap 360 and fastener 350. In these and other embodiments of the present invention, endcap 360 and fastener 350 can be formed as a single piece. Fastener 350 can include hole 352 for a tool (not shown), where the tool can be used to turn fastener 350 and endcap 360. Endcap 360 and fastener 350 can be inserted in a rear opening of sleeve 310 and turned to lock endcap 360 in place. A stiffener 240 can be attached to, or formed as part of, flexible circuit board 230. Flexible circuit board 230 and stiffener 240 can be positioned such that stiffener 240 is between flexible circuit board 230 and organizer 390. Flexible circuit board 230 can include opening 610 (shown in FIG. 6) such that fastener 350 presses against stiffener 240 directly and does not crush a portion of flexible circuit board 230.

In this example, sleeve 310, endcap 360, fastener 350, and stiffener 240 can be conductive. This can form a first ground path through sleeve 310, endcap 360, fastener 350, and stiffener 240 to a ground in flexible circuit board 230.

A second ground path can be formed through contact 380. Specifically, contact 380 can include contacting portion 382 that can physically and electrically contact sleeve 310. Contact 380 can further include contact tail 384, which can electrically connect to a ground in flexible circuit board 230. Contact 380 can be supported by extended portion 392, shown in FIG. 18.

A third ground path through a ground contact, which can be one of the contacts 220 in audio jack 320, that mates with a ground contact on an audio plug can also be included. The third ground path can be kept isolated, for example using a filter, from the first and second ground paths for noise reasons.

During assembly, contacts 220 can be stamped or otherwise formed. These contacts 220 can be inserted in housing 210, or housing 210 can be formed around contacts 220. Contact 380 can be placed in extended portion 392 of organizer 390. Organizer 390 can be placed against an end of housing 210. Stiffener 240 can be placed against a rear of organizer 390. Stiffener 240 can be attached to, or formed as part of, flexible circuit board 230, which can be attached to contact tails 224, for example by soldering, reflow soldering, waves soldering, or other soldering or attachment process. Fastener 350 can be attached to endcap 360. Fastener 350 can be fit in a rear opening of sleeve 310 and turned, thereby locking endcap 360 in place in sleeve 310.

Figure 4:
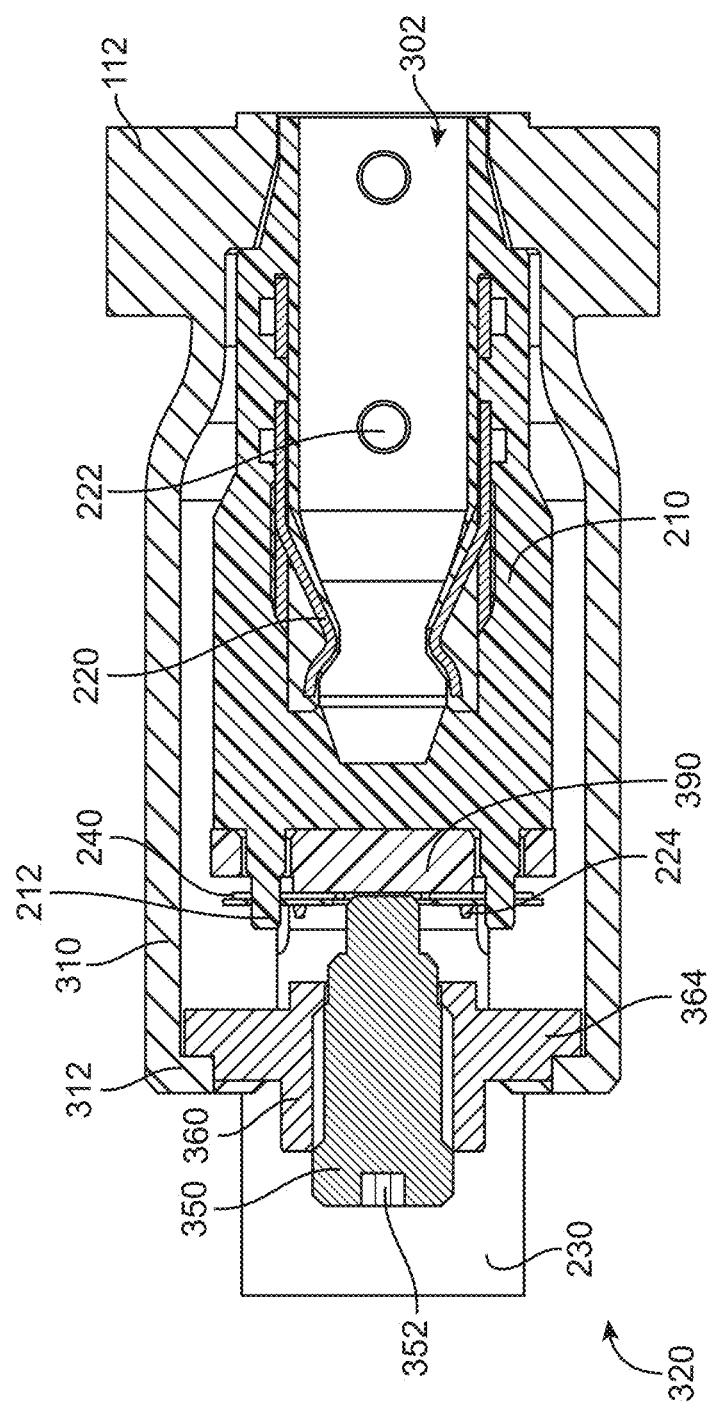
FIG. 4 illustrates another cross-section of an audio jack and device closure according to an embodiment of the present invention.

FIG. 4 illustrates another cross-section of an audio jack and device enclosure according to an embodiment of the present invention. This cross-section is taken along cut section "4-4" in FIG. 2. Again, audio jack 320 can be located in sleeve 310, which can be formed as part of enclosure wall 112. Sleeve 310 can extend from enclosure wall 112 into an electronic device.

Housing 210 can be located in sleeve 310. Housing 210 can include passage 302 that can accept corresponding audio plug 142 (shown in FIG. 1.) Housing 210 can support a number of contacts 220. Contacts 220 can include contacting portions 222 that can physically and electrically connect to contacts on the corresponding audio plug. Contacts 220 can further include contact tails 224. Posts 212 of housing 210 can pass through organizer 390 to align organizer 390 to housing 210. Organizer 390 can be used to align contact tails 224 of contacts 220. Contact tails 224 can be soldered or otherwise attached to flexible circuit board 230. Flexible circuit board 230 can be routed to other electronic audio circuits (not shown) in the electronic device.

Housing 210 and organizer 390 can be held in place by endcap 360 and fastener 350. Fastener 350 can include hole 352 for a tool (not shown), where the tool can be used to turn fastener 350 and endcap 360. Endcap 360 and fastener 350 can be inserted in a rear opening of sleeve 310 and turned to lock endcap 360 in place. A stiffener 240 can be placed between flexible circuit board 230 and organizer 390. Flexible circuit board 230 can include opening 610 (shown in FIG. 6) such that fastener 350 presses against stiffener 240 directly and does not crush a portion of flexible circuit board 230. Endcap 360 can include locking tab 364, which can engage locking feature or tab 312 on sleeve 310.

Figure 5:
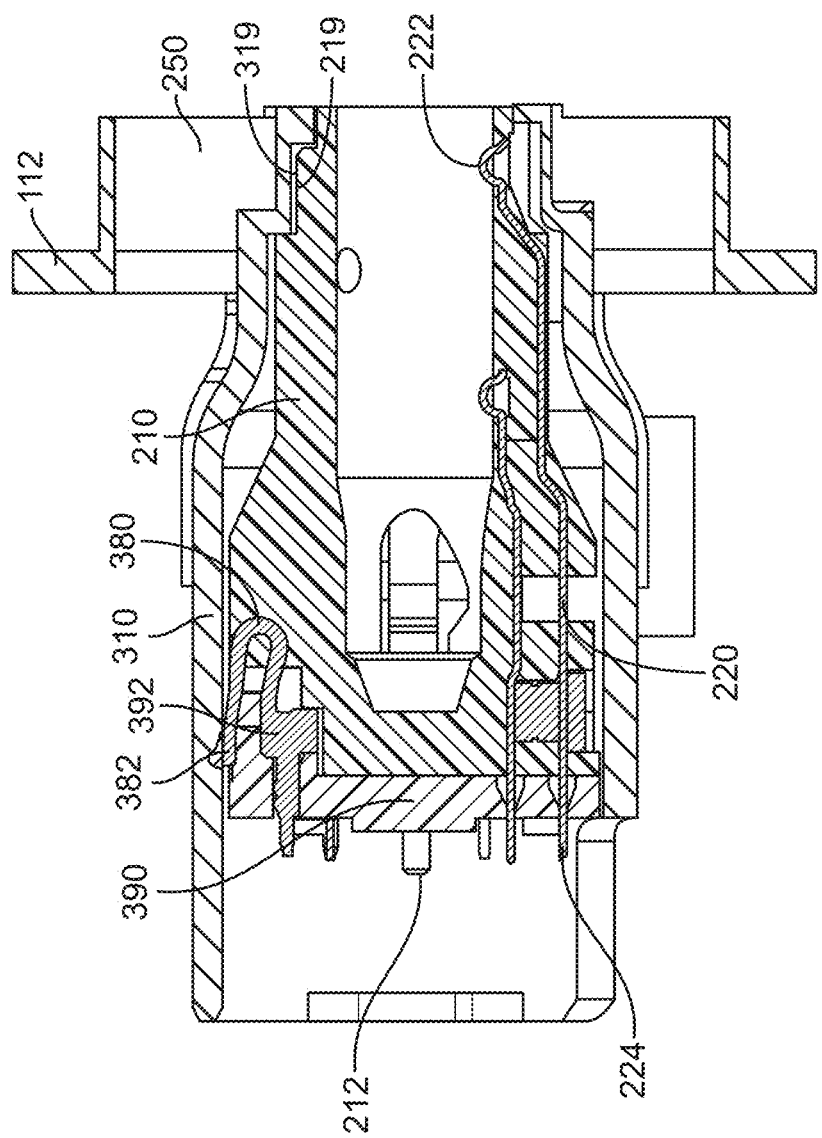
FIG. 5 through FIG. 10 illustrate a method of manufacturing an audio jack according to an embodiment of the present invention.

FIG. 5 through FIG. 10 illustrates a method of manufacturing an audio jack according to an embodiment of the present invention. In FIG. 5, housing 210 and organizer 390 have been inserted into sleeve 310 of enclosure wall 112. Enclosure wall 112 can have holes or perforations 250 for ventilation. Housing 210 can support a number of contacts 220. Contacts 220 can include contacting portions 222 for contacting a corresponding contact on an audio plug. Organizer 390 can be placed against a rear of housing 210 to support contact tails 224. Posts 212 of housing 210 can be used to align organizer 390 to housing 210. Contact 380 can be supported by extended portion 392 of organizer 390 and can include contacting portion 382 that physically and electrically connects to in inside surface of sleeve 310.

Housing 210 can include keying feature 219 that can mate with keying feature 319 on sleeve 310. These keying features 219 and 319 can prevent housing 210 from rotating inside of sleeve 310 during further assembly steps, for example, when fastener 350 is turned to lock endcap 360 in place in sleeve 310, as shown below in FIGS. 8-10.

Figure 6:
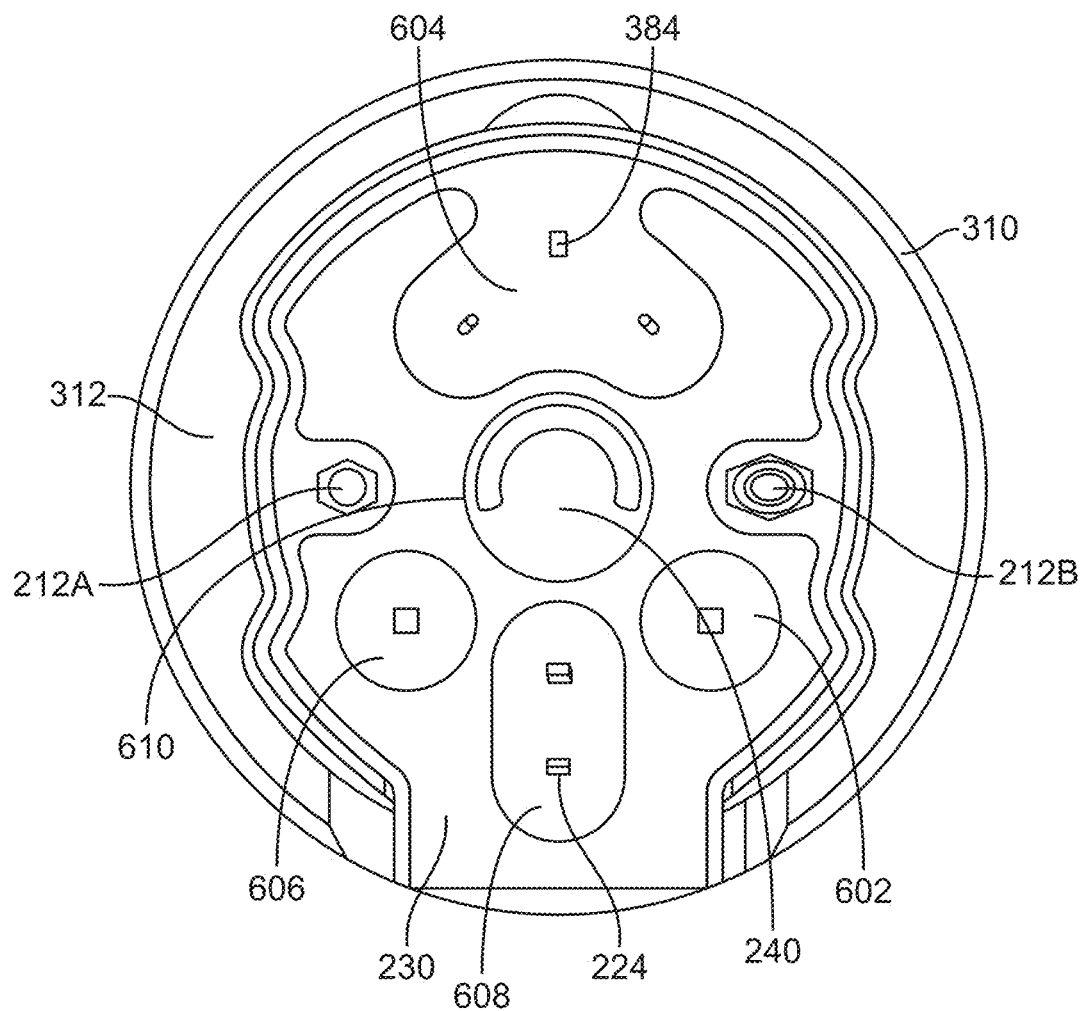
Figure 7:
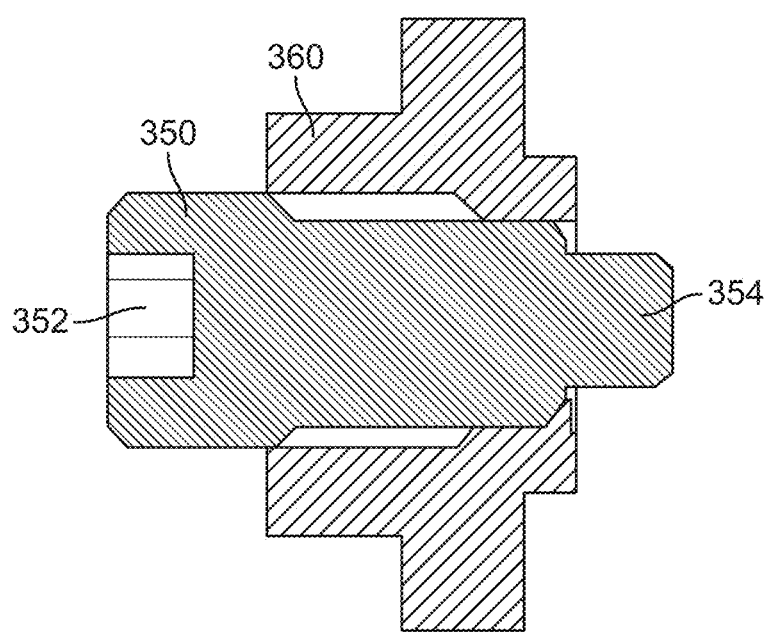
Figure 8:
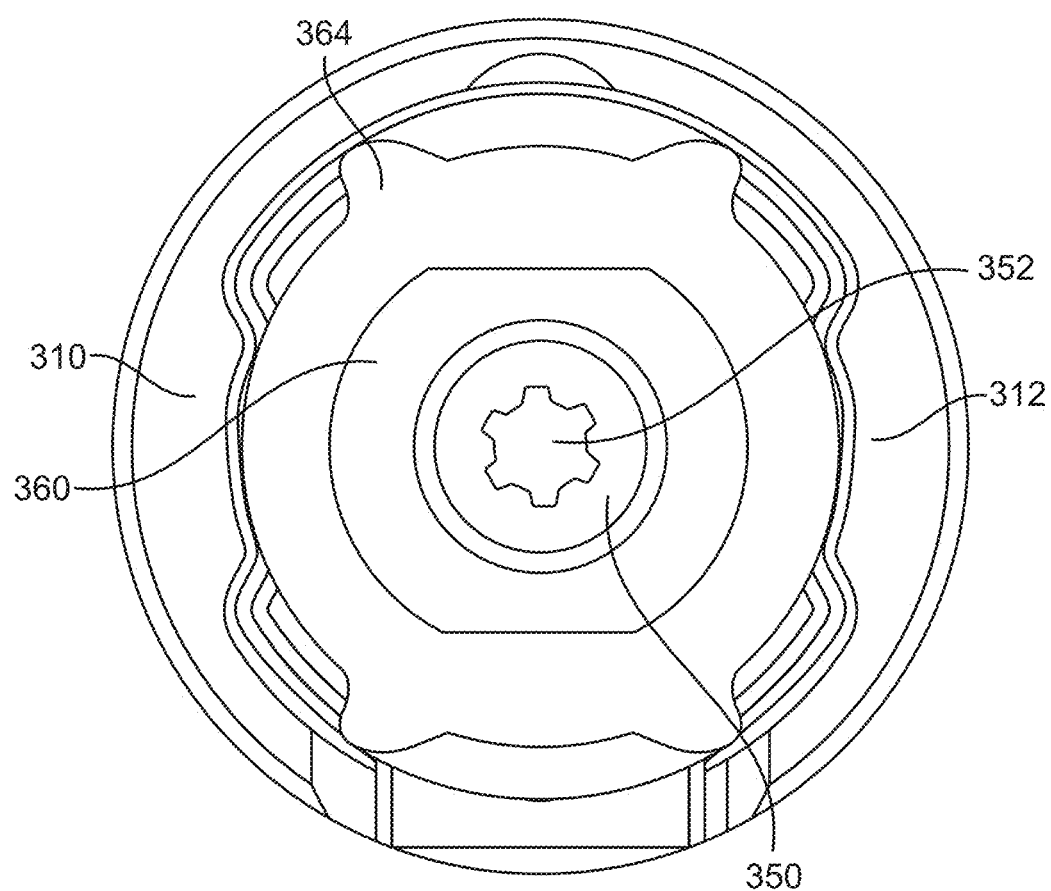

FIG. 6 illustrates a rear view of an audio jack after stiffener 240 and flexible circuit board 230 have been attached to housing 210 (shown in FIG. 5) and the assembly has been located in sleeve 310. Stiffener 240 and flexible circuit board 230 can be attached either before or after housing 210 is inserted into sleeve 310. In this example, flexible circuit board 230 can include solder areas 602, 604, 606, and 608. These solder areas 602, 604, 606, and 608 can be used to connect contact tails 224 and 384 to traces in flexible circuit board 230. That is, contact tails 224 and 384 can pass through openings in stiffener 240 and flexible circuit board 230 and can be soldered at solder areas 602, 604, 606, and 608 to form connections to traces or paths in flexible circuit board 230. Flexible circuit board 230 can further include opening 610. Fastener 350 (shown in FIG. 3) can physically and electrically contact stiffener 240 through opening 610. Sleeve 310 can include locking features or tabs 312. Posts 212 can be used below to align organizer 390 to housing 210 (shown in FIG. 17.) Posts 212 can include two different posts, identified here as posts 212A and 212B. In FIG. 7, fastener 350 can be mated with endcap 360. Fastener 350 can include hole 352 that can accept a tool (not shown), where the tool can be used to rotate fastener 350. Fastener 350 can physically and electrically connect to stiffener 240 (shown in FIG. 6) at surface 354. In these and other embodiments of the present invention, endcap 360 and fastener 350 can be formed as a single piece. In FIG. 8, endcap 360 and fastener 350 can be inserted into a rear opening of sleeve 310. Endcap 360 can be aligned such that tabs 364 do not engage tabs 312 on a back of sleeve 310.

Figure 9:
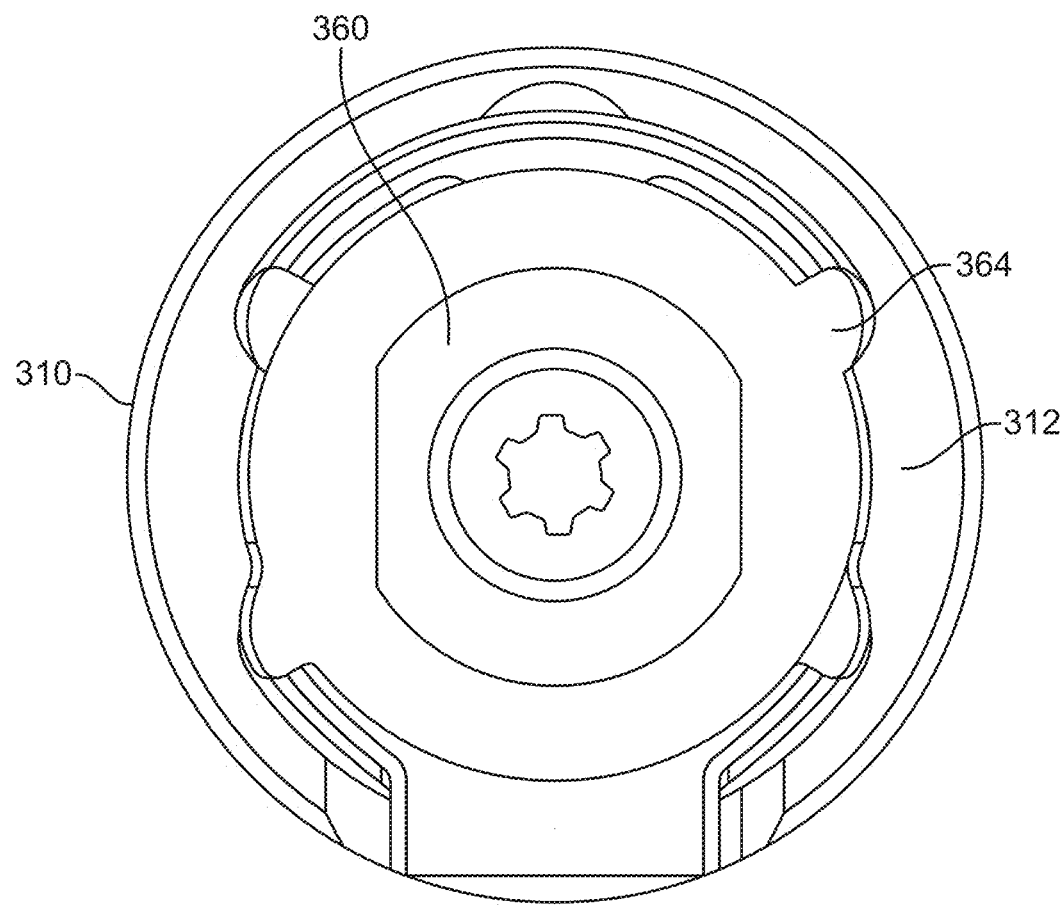
Figure 10:
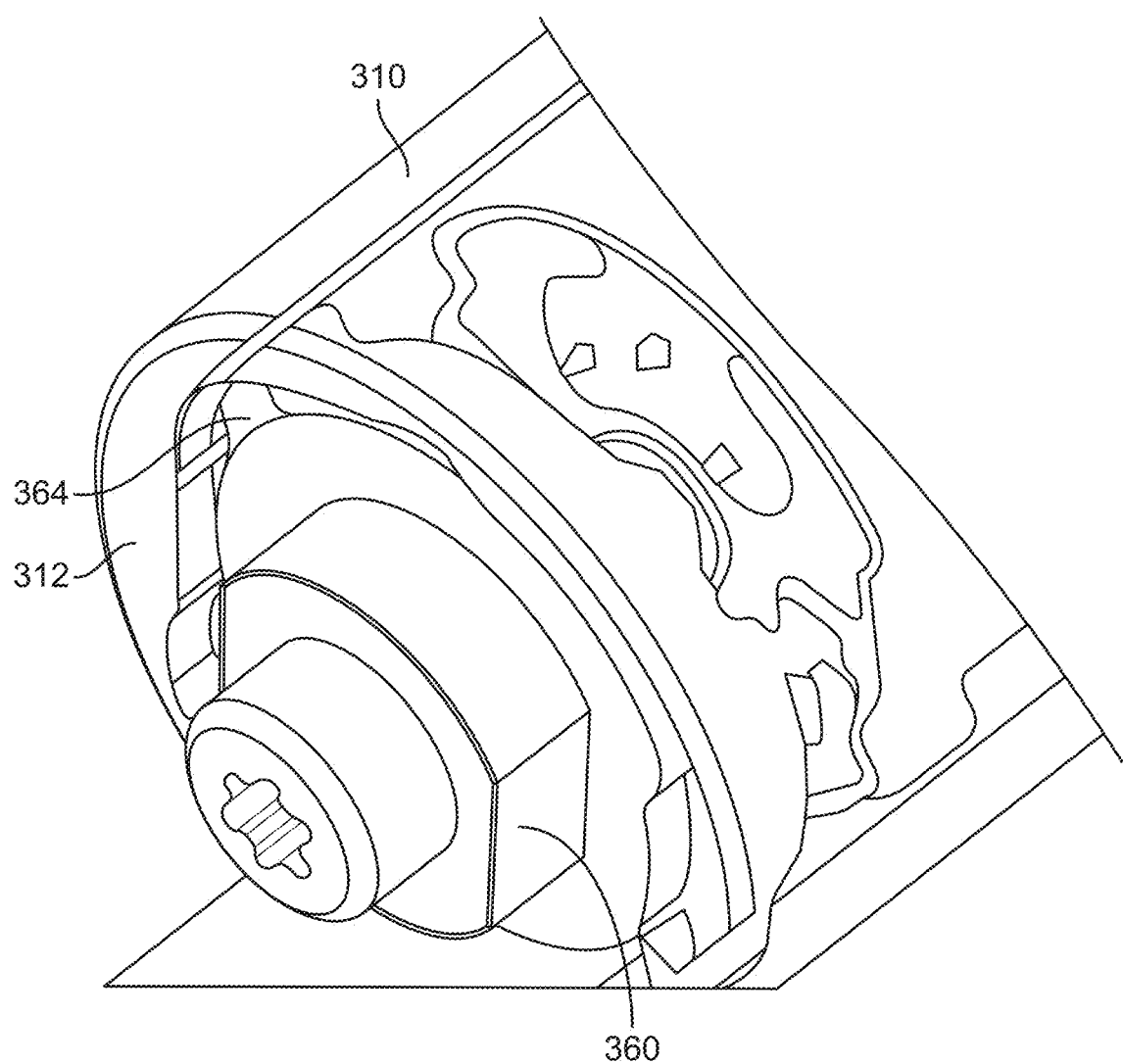

Fastener 350 and endcap 360 can be rotated using a tool (not shown) in hole 352. When this is done, tabs 364 on endcap 360 can be aligned with tabs 312 on sleeve 310, as shown in FIG. 9. This can secure endcap 360 in sleeve 310. In FIG. 10, tabs 364 of endcap 360 are held in place by tabs 312 of sleeve 310.

Figure 11:
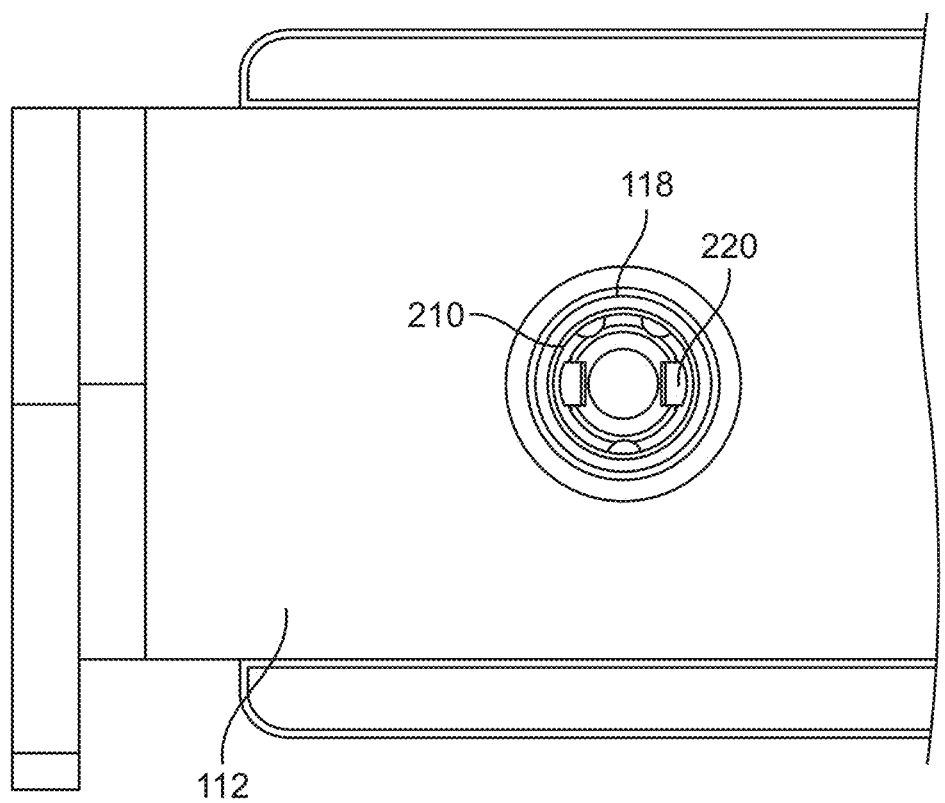
FIG. 11 illustrates a portion of a device enclosure according to an embodiment of the present invention.

FIG. 11 illustrates a portion of a device enclosure according to an embodiment of the present invention. In this example, the mesh formed by perforations 250 (shown in FIG. 2) has been omitted and enclosure wall 112 can have a more solid surface. Audio jack 320 (shown in FIG. 3) including housing 210 supporting contacts 220 can be located in opening 118 of enclosure wall 112.

Figure 12:
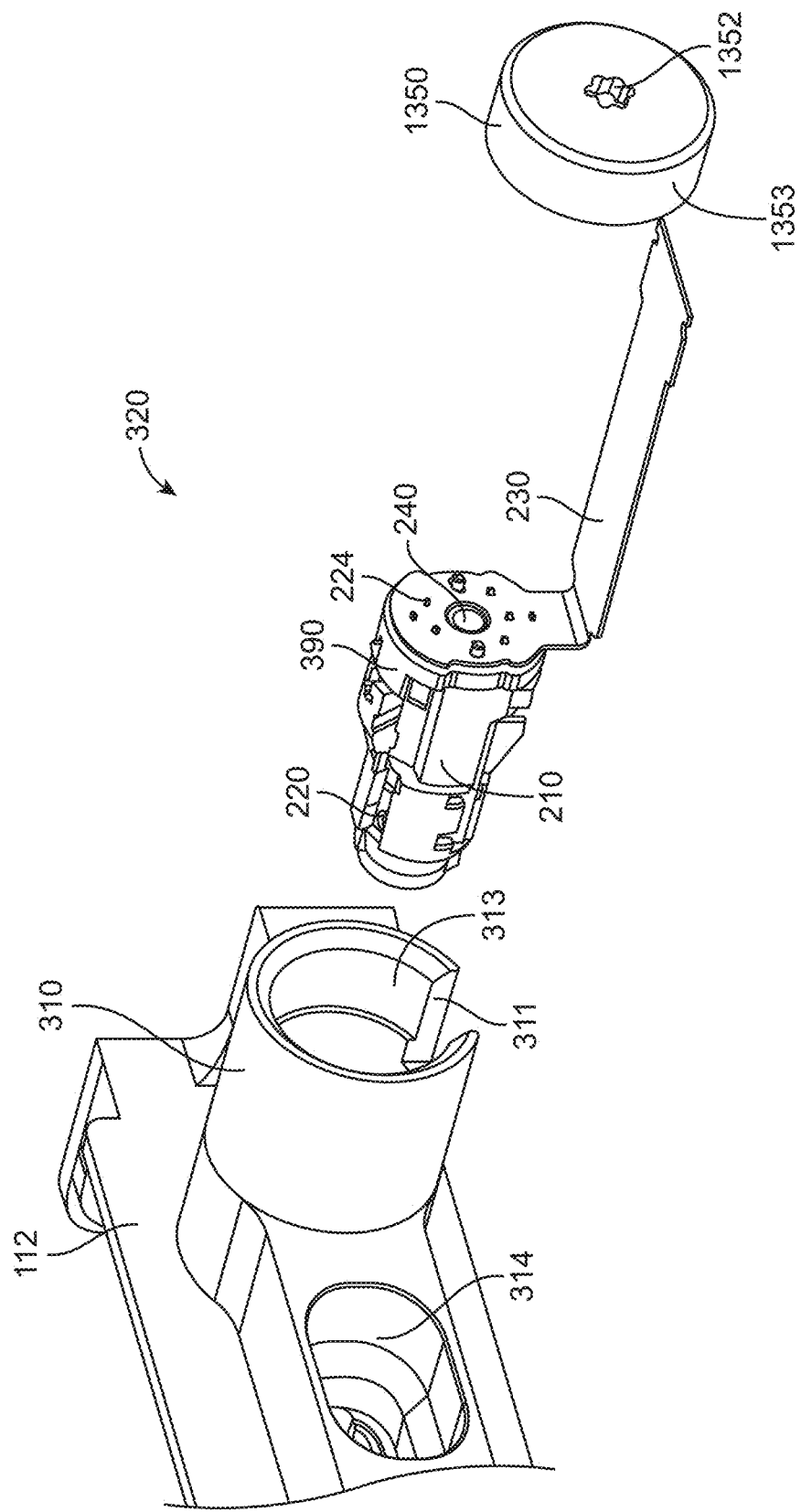
FIG. 12-14 illustrate a method of manufacturing an audio jack according to an embodiment of the present invention.
Figure 13:
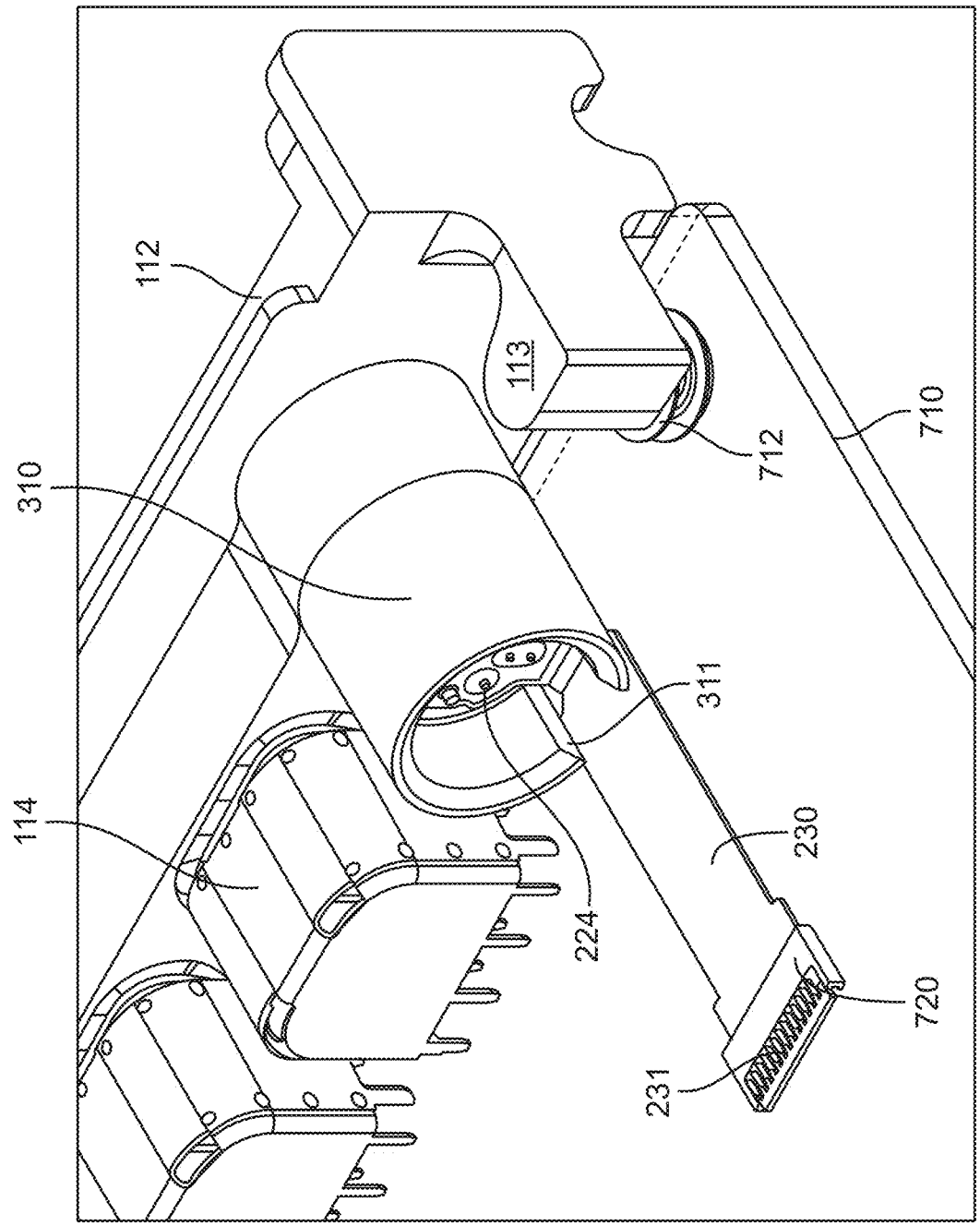
Figure 14:
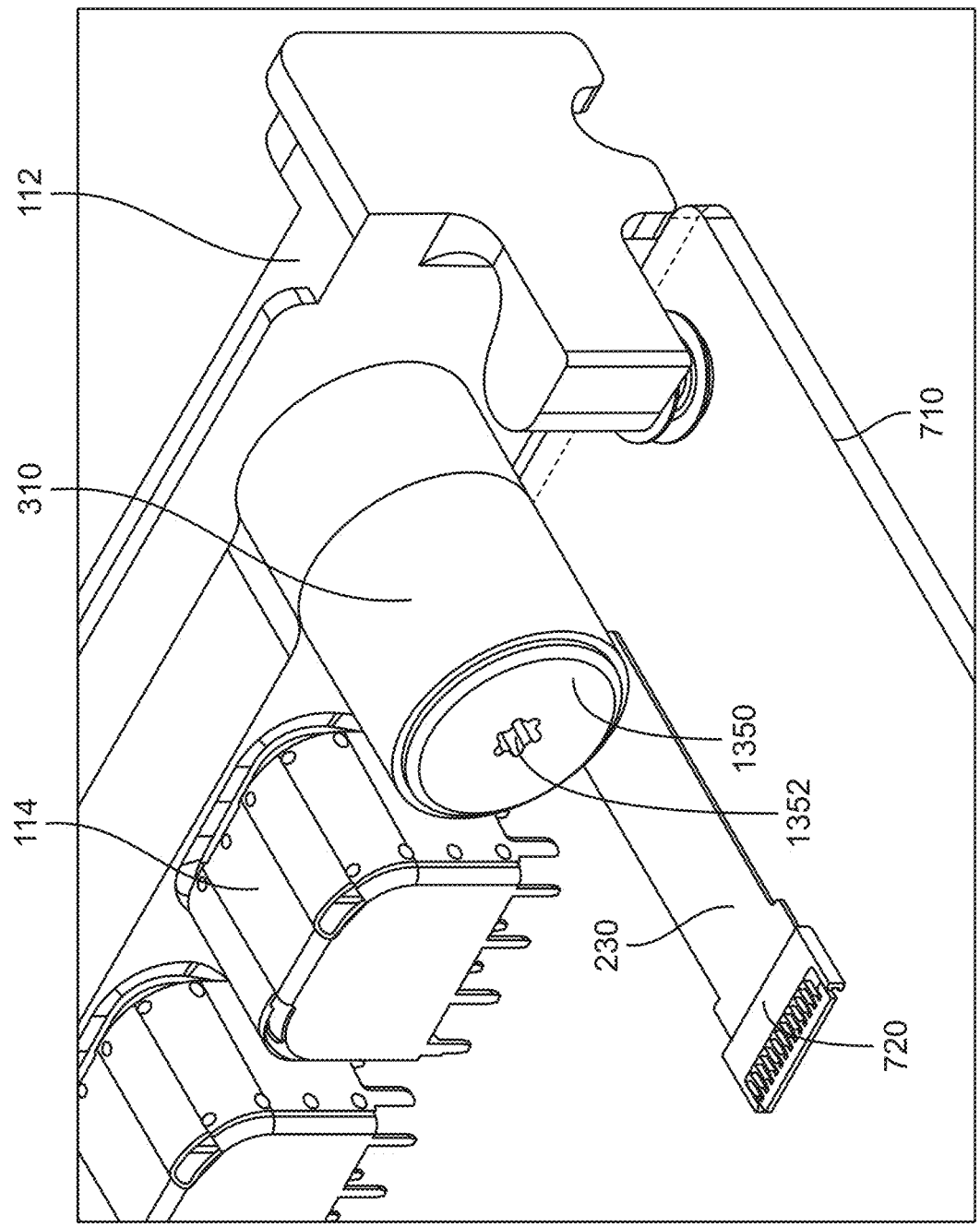

FIG. 12-14 illustrate a method of manufacturing an audio jack according to an embodiment of the present invention. In FIG. 12, an audio jack 320 can be inserted in sleeve 310 of enclosure wall 112. Housing 210 can support contacts 220, which can terminate at contact tails 224. Contact tails 224 can be supported by organizer 390 and can be soldered to flexible circuit board 230. Stiffener 240 can be between organizer 390 and flexible circuit board 230. Stiffener 240 can be formed separately or stiffener 240 can be formed on a surface of flexible circuit board 230.

Flexible circuit board 230 can be routed out of sleeve 310 through cutout 311. Fastener 1350 can be threaded or otherwise inserted into sleeve 310. For example, fastener 1350 can include a threaded surface 1353 that can mate with threaded surface 313 inside of sleeve 310. Fastener 1350 can be turned using a tool (not shown) placed in hole 1352. A front portion of connector receptacle 114 (shown in FIG. 13) can be inserted into sleeve 314 of enclosure wall 112.

FIG. 13 illustrates another rear view of an audio jack after flexible circuit board 230 has been attached to housing 210 (shown in FIG. 5) and the assembly has been located in sleeve 310. Enclosure wall 112 can be attached to board 710 by fastener 714 (shown in FIG. 15), which can pass through opening 712 in board 710 and into a hole (not shown) in extended portion 113 of enclosure wall 112. Flexible circuit board 230 can terminated in contacts 231. Contacts 231 can be formed on a surface of flexible circuit board 230 and can be supported in connector 720, which can be located on board 710. Contact tails 224 can be soldered to flexible circuit board 230. A cutout 311 can be formed in sleeve 310 to allow for the passage of flexible circuit board 230 out of sleeve 310. Connector receptacle 114 can be mounted on board 710. In FIG. 14, fastener 1350 can be inserted in sleeve 310 and rotated into position using a tool (not shown) in hole 1352. Flexible circuit board 230 can escape sleeve 310 at cutout 311 (shown in FIG. 12) and can terminate at connector 720 on board 710. Sleeve 310 can terminate in enclosure wall 112, which can be mounted, along with connector receptacle 114, on board 710.

Figure 15:
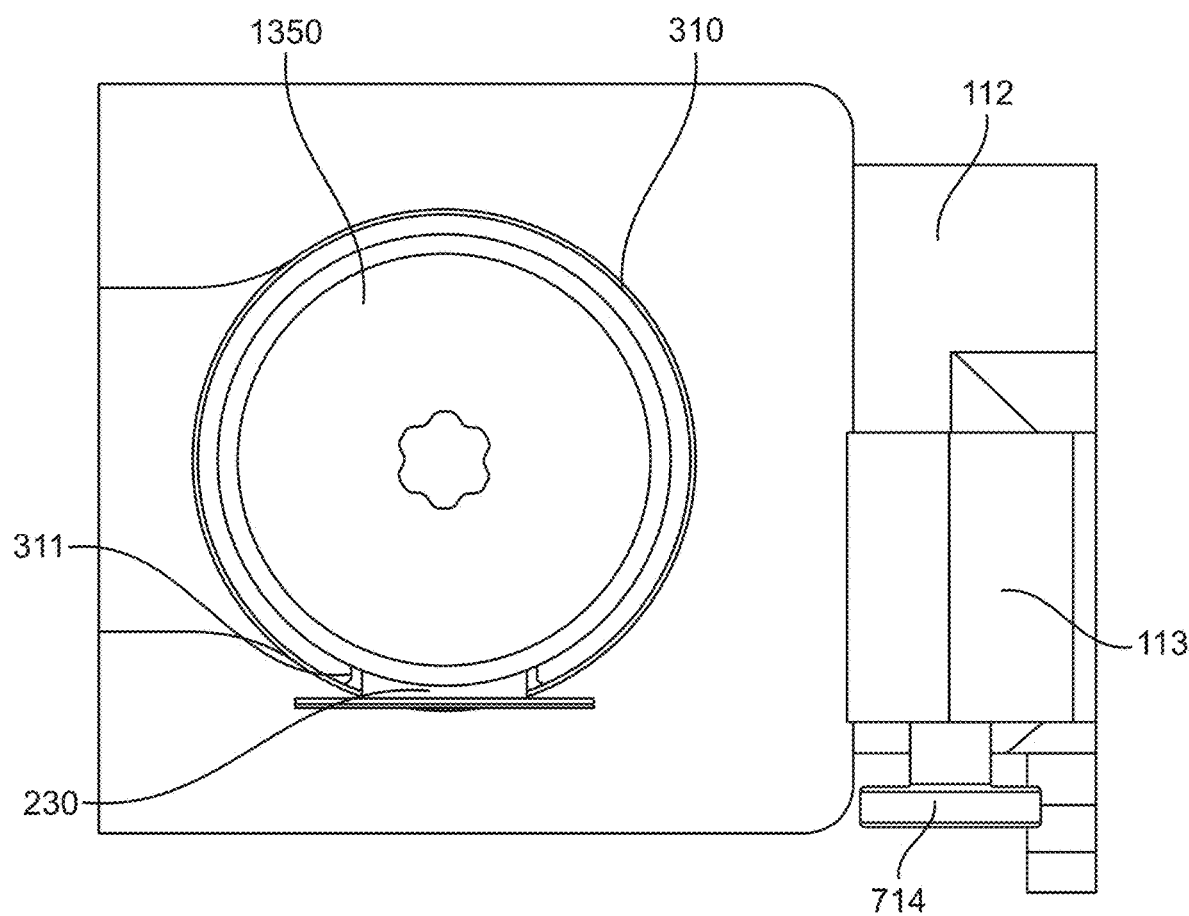
FIG. 15 is a rear view of an audio jack and device enclosure according to an embodiment of the present invention.

FIG. 15 is a rear view of an audio jack and device enclosure according to an embodiment of the present invention. Fastener 1350 can be in place in a rear opening of sleeve 310. Flexible circuit board 230 can be routed through cutout 311 in sleeve 310 of enclosure wall 112. Enclosure wall 112 can be attached to board 710 (shown in FIG. 13) by fastener 714. Fastener 714 can pass through opening 712 (shown in FIG. 13) in board 710 (shown in FIG. 13) and be threaded or otherwise fixed in a hole (not shown) in extended portion 113 of enclosure wall 112.

Figure 16:
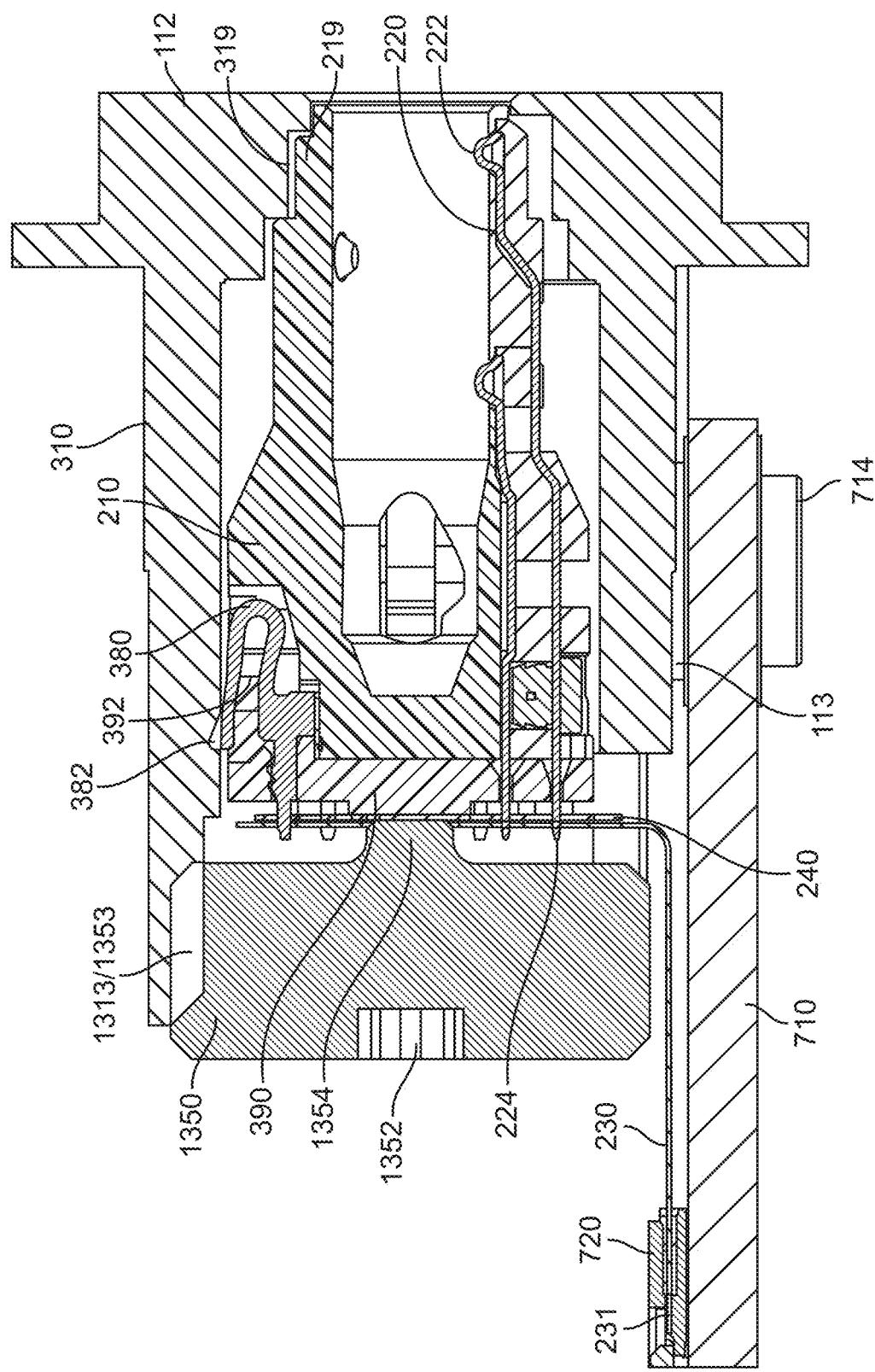
FIG. 16 illustrates another cross-section of an audio jack and device closure according to an embodiment of the present invention.

FIG. 16 illustrates another cross-section of an audio jack and device closure according to an embodiment of the present invention. Housing 210 and organizer 390 can be located in sleeve 310 of enclosure wall 112. Housing 210 can support a number of contacts 220. Contacts 220 can include contacting portions 222 for contacting a corresponding contact on a corresponding audio plug 142 (shown in FIG. 1.) Organizer 390 can be placed against a rear of housing 210 to support contact tails 224. Contact 380 can be supported by extended portion 392 of organizer 390 and can include contacting portion 382 that physically and electrically connects to in inside surface of sleeve 310.

Housing 210 can include keying feature 219 that can mate with keying feature 319 on sleeve 310. These keying features 219 and 319 can prevent housing 210 from rotating inside of sleeve 310 during further assembly steps, for example, when fastener 1350 is screwed or threaded into sleeve 310. Threads on threaded surface 1353 on fastener 1350 can mate with threads on threaded surface 313 of sleeve 310. Again, fastener 1350 can be turned using a tool (not shown) in hole 1352. Fastener 1350 can secure flexible circuit board 230, stiffener 240, and organizer 390 in place at a rear of housing 210. Fastener 1350 can physically and electrically connect to stiffener 240 (shown in FIG. 6) through opening 610 (shown in FIG. 6) in flexible circuit board 230 at surface 1354.

Enclosure wall 112 can include an extended portion 113 that can have a hole (not shown) to accept an end of fastener 714. Fastener 714 can pass through opening 712 (shown in FIG. 13) in board 710 and be threaded or otherwise fixed in the hole in extended portion 113. Flexible circuit board 230 can terminate at contacts 231, which can be supported by connector 720.

Figure 17:
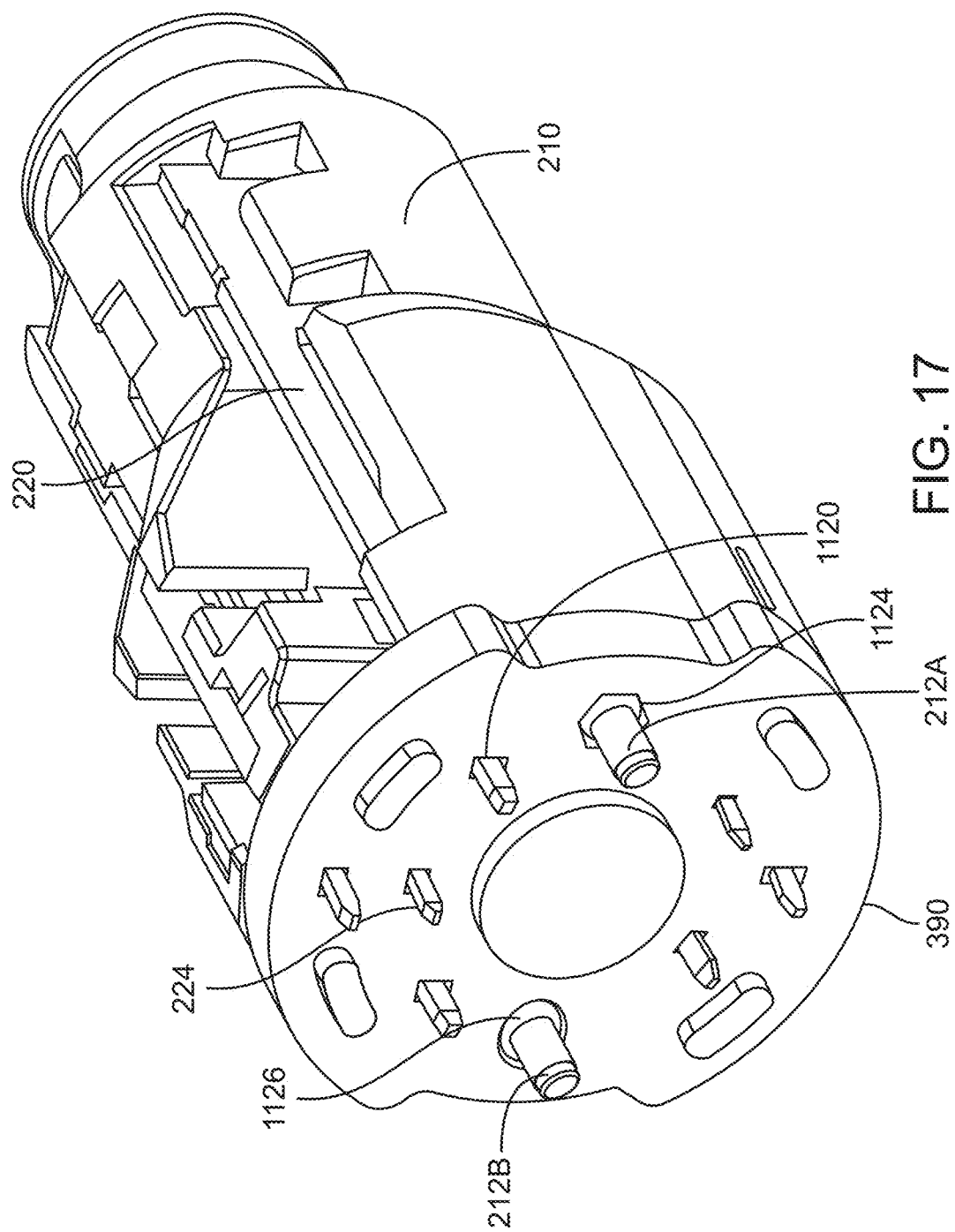
FIG. 17 illustrates a portion of an audio jack according to an embodiment of the present invention.

FIG. 17 illustrates a portion of an audio jack according to an embodiment of the present invention. In this example, contacts 220 are supported by housing 210. Contacts 220 can include contact tails 224 which can be available at openings 1120 in organizer 390. Posts 212A and 212B can pass through openings 1124 and 1126 in organizer 390. Posts 212 A and 212 B can have different shapes corresponding to shapes of openings 1124 and 1126 to aid in device assembly.

Figure 18:
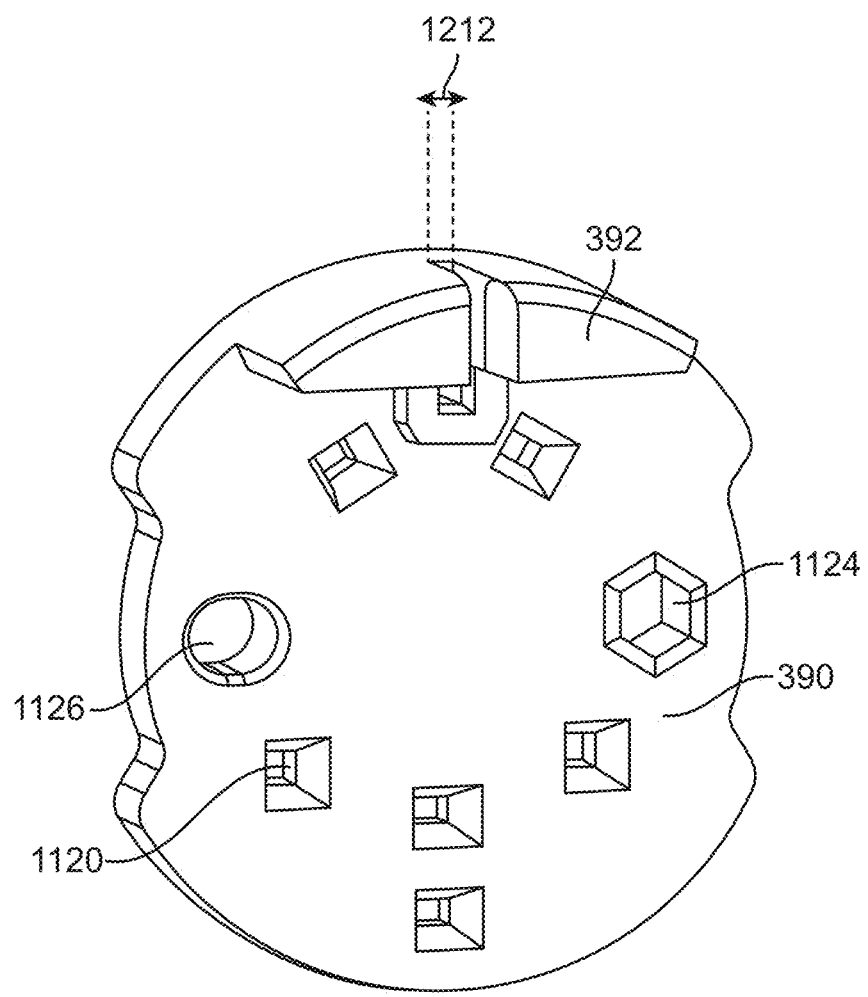
FIG. 18 illustrates an organizer for an audio jack according to an embodiment of the present invention.

FIG. 18 illustrates an organizer for an audio jack according to an embodiment of the present invention. Organizer 390 can include openings 1120 for contact tails 224 (shown in FIG. 17.) Organizer 390 can include openings 1124 and 1126 for posts 212A and 212B of housing 210 (shown in FIG. 17.) Organizer 390 can further include a slot 1212 on extended portion 392. This slot 1212 and extended portion 392 can support contact 380 (shown in FIG. 5.)

An illustrative embodiment of the present invention can provide audio jacks 320 and device enclosures, including enclosure wall 112, having an aesthetically pleasing appearance. For example, even though an enclosure wall 112 can have a number of holes or perforations 250 for a mesh appearance, audio jack 320 can only be visible to a limited extent. For example, tapered sleeve 310 can provide a minimal front aperture 260 for an improved appearance. Tapered sleeve 310 can limit the visibility of the audio jack and their structures as viewed from outside the electronic device. Some or all of the sleeve 310 and flexible circuit board 230 can be darkened to absorb light and reduce reflections and match an enclosure wall 112. Some of all of these structures can be darkened using a conductive black PVD (physical vapor deposition) process, cosmetic tape, paint, pad printing, plating, laser darkening, or other process or material. These structures can each be colored black, though they can have other colors as well. This can give the audio jacks 320 at openings in enclosure wall 112 the appearance that they are floating in the mesh of the enclosure wall 112.

These enclosure walls 112 and sleeves 310 can be formed in various ways in these and other embodiments of the present invention. For example, they can be formed by machining, such as by using computer numerical controlled machines, stamping, deep drawing, forging, metal-injection molding, micro-machining, 3-D printing, or other manufacturing process. These enclosure walls 112 and sleeve 310 can be formed of various materials. For example, they can be formed of aluminum, steel, stainless steel, copper, bronze, or other material. In these and other embodiments of the present invention, a material having good electrical and thermal conductivity can be chosen.

In various embodiments of the present invention, contacts 220, stiffeners 240, endcaps 360, fasteners 350, and other portions of audio jacks 320 and device enclosures can be formed by stamping, metal-injection molding, machining, micro-machining, 3-D printing, or other manufacturing process. These portions can be formed of stainless steel, steel, copper, copper titanium, phosphor bronze, or other material or combination of materials. They can be plated or coated with nickel, gold, or other material. Other portions, such as audio jack housings and other structures can be formed using injection or other molding, 3-D printing, machining, or other manufacturing process. These portions can be formed of silicon or silicone, rubber, hard rubber, plastic, nylon, liquid-crystal polymers (LCPs), ceramics, or other nonconductive material or combination of materials.

Embodiments of the present invention can provide audio jacks 320 and device enclosures, including enclosure wall 112, that can be located in, or can connect to, various types of devices, such as portable computing devices, tablet computers, desktop computers, laptops, all-in-one computers, wearable computing devices, smartphones, storage devices, portable media players, navigation systems, monitors, power supplies, video delivery systems, adapters, remote control devices, chargers, and other devices.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. An electronic device comprising:
   a device enclosure for the electronic device, the device enclosure comprising:
   an enclosure wall having an opening;
   a sleeve integrally formed with the enclosure wall, the sleeve having a front aperture aligned with the opening in the enclosure wall, the sleeve extending into the electronic device from the enclosure wall and terminating in a rear opening; and
   an audio jack assembly located in the sleeve and comprising:
      a housing;
      a plurality of contacts supported by the housing, each of the plurality of contacts comprising a contacting portion and a contact tail;
      an organizer around the contact tails of the plurality of contacts;
      a board attached to the contact tails of the plurality of contacts, wherein the board includes an opening;
      a stiffener between the organizer and the board; and
      a fastener attached to the sleeve at the rear opening and physically and electrically contacting the stiffener through the opening in the board.

2. The electronic device of claim 1 wherein the housing comprises a passage to accept a corresponding audio plug.

3. The electronic device of claim 2 wherein the board is a flexible circuit board.

4. The electronic device of claim 3 wherein the fastener, stiffener, and sleeve are conductive, such that a first ground path is through the sleeve, the fastener, and the stiffener to electrically contact a ground in the flexible circuit board.

5. The electronic device of claim 4 further comprising a ground contact, where the ground contact comprises a contacting portion physically and electrically contacting the sleeve, and a tail portion attached to the flexible circuit board.

6. The electronic device of claim 5 wherein a second ground path is through the sleeve, the ground contact, and a ground path in the flexible circuit board.

7. An audio jack comprising:
   a housing to fit in a sleeve of a device enclosure, the housing comprising a passage defining a circular front opening, the passage and circular front opening shaped to accept a corresponding audio plug, the housing further comprising a plurality of contact openings;
   a plurality of contacts supported by the housing, each of the contacts comprising a contacting portion at a first end to mate with a corresponding contact on the audio plug when the audio plug is inserted into the audio jack, and a contact tail at a second end, wherein each contacting portion is positioned in a corresponding contact opening in the passage in the housing;
   a board;
   an organizer between the board and the housing; and
   a stiffener between the organizer and the board,
   wherein each contact tail extends through the organizer and the stiffener and is attached to the board.

8. The audio jack of claim 7 wherein the housing comprises a passage to accept the corresponding audio plug.

9. The audio jack of claim 8 wherein the board comprises an opening to allow a fastener to contact the stiffener.

10. The audio jack of claim 9 wherein the board is a flexible circuit board.

11. The audio jack of claim 10 further comprising the sleeve and a fastener, the fastener attached to the sleeve and contacting the stiffener, wherein the fastener, stiffener, and sleeve are conductive, such that a first ground path is through the sleeve, the fastener, and the stiffener to electrically contact a ground in the flexible circuit board.

12. The audio jack of claim 11 further comprising a ground contact, where the ground contact comprises a contacting portion physically and electrically contacting the sleeve, and a tail portion attached to the flexible circuit board.

13. The audio jack of claim 9 wherein the fastener contacts the stiffener through the opening in the board.

14. An electronic device comprising:
   a device enclosure for the electronic device, the device enclosure comprising:
   an enclosure wall having an opening; and
   a sleeve integrally formed with the enclosure wall, the sleeve having a front aperture aligned with the opening in the enclosure wall, the sleeve extending into the electronic device from the enclosure wall and terminating in a rear opening, the sleeved having a cutout extending from the rear opening towards the enclosure wall; and an audio jack assembly located in the sleeve and comprising:

a housing;

a plurality of contacts supported by the housing, each of the contacts comprising a contacting portion and a contact tail;

a fastener attached to the sleeve at the rear opening to secure the housing in the sleeve between the fastener and the enclosure wall; and a board, wherein inside the sleeve, the board is attached to each contact tail of the plurality of contacts, and the board exits the sleeve through the cutout and between the fastener and housing.

15. The electronic device of claim 14 wherein the housing comprises a passage to accept a corresponding audio plug.

16. The electronic device of claim 15 wherein the board is a flexible circuit board.

17. The electronic device of claim 16 further comprising an organizer having a corresponding opening for each of the contact tails.

18. The electronic device of claim 17 wherein the housing comprises a first post and a second post to pass through corresponding openings in the organizer.

19. The electronic device of claim 18 wherein the first post and the second post have different shapes.

20. The electronic device of claim 14 wherein the electronic device is a desktop computer.

* * * * *